(12) United States Patent
Stewart et al.

(10) Patent No.: US 6,961,844 B1
(45) Date of Patent: Nov. 1, 2005

(54) SYSTEM AND METHOD FOR EXTRACTING INSTRUCTION BOUNDARIES IN A FETCHED CACHELINE, GIVEN AN ARBITRARY OFFSET WITHIN THE CACHELINE

(75) Inventors: Charles H. Stewart, Richardson, TX (US); Asheesh Kashyap, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 546 days.

(21) Appl. No.: 09/972,404

(22) Filed: Oct. 5, 2001

(51) Int. Cl.[7] ............................................. G06F 9/30
(52) U.S. Cl. ...................................... 712/210; 712/208
(58) Field of Search ............................... 712/208, 210, 712/213, 215

(56) References Cited

U.S. PATENT DOCUMENTS 4,691,254 A * 9/1987 Cloke ........................... 360/45
5,835,746 A * 11/1998 Girardeau et al. ........... 712/215

OTHER PUBLICATIONS

Aborhey, S. "Binary Decision Tree Test Functions". ©1988 IEEE. pp. 1461-1465.*

Mauborgne, Laurent. "Binary Decision Graphs". In A. Cortesi and G. File, editors. Static Analysis Symposium (SAS'99), vol. 1694 of Lecture Notes in Computer Science. ©1999. pp. 101-116.*

Moret, Bernard M. E. "Decision Trees and Diagrams". Computing Surveys, vol. 14, No. 4 ©1982 Dec.*

* cited by examiner

*Primary Examiner*—Eddie Chan
*Assistant Examiner*—Aimee J. Li
(74) *Attorney, Agent, or Firm*—Daffer McDaniel LLP

(57) ABSTRACT

A system and method are presented for pre-decoding (i.e., determining the address boundaries of) variable-length instructions within an instruction block fetched from memory. The instruction block represents the contents of consecutive addresses in memory, and is fetched in response to a microprocessor request for a specific instruction within the block. After pre-decoding, the instructions present in the block are placed into a cache for execution by the microprocessor. Conventional instruction pre-decoding methods apply only to instructions fetched from addresses at or beyond the address of the requested instruction. The remaining instructions in the block are therefore not utilized. The system and method disclosed herein permit backward pre-decoding of the instruction block, in which the address boundaries of instructions fetched from addresses prior to that of the requested instruction may also be determined. This capability results in more efficient use of the cache.

22 Claims, 11 Drawing Sheets

SYSTEM AND METHOD FOR EXTRACTING INSTRUCTION BOUNDARIES IN A FETCHED CACHELINE, GIVEN AN ARBITRARY OFFSET WITHIN THE CACHELINE

BACKGROUND OF THE INVENTION

1. Field of Invention

This invention relates to microprocessor design, and more particularly, to techniques for more efficient utilization of cache in a microprocessor.

2. Description of Related Art

Advances in semiconductor manufacturing have greatly improved the performance of microprocessors, while at the same time reducing their cost. Consequently, the use of microprocessors has become more and more widespread. Today, they are present not only in computers, but also in various consumer-oriented products, such as VCRs, microwave ovens and automobiles. In many cases, low cost is more important than high-performance. For example, a microprocessor-controlled washing machine may require the microprocessor to do nothing more than accept user commands and time the wash cycles. On the other hand, some applications demand the highest performance obtainable. For example, modern telecommunications requires very high speed processing of multiple signals representing voice, video, data, etc., which have been densely combined to maximize the use of available communication channels.

A rough measure of a microprocessor's performance is the speed with which it executes an instruction sequence, sometimes stated in millions of instructions per second, or MIPS. Since there are many applications in which microprocessor speed is extremely important, designers have evolved a number of speed-enhancing techniques and architectural features. Among these techniques and features are the instruction pipeline and the use of cache memory.

A pipeline consists of a sequence of stages through which instructions pass as they are executed, with partial processing of an instruction being performed in each stage. In a typical microprocessor, each instruction comprises an operator and one or more operands. The operator represents a code designating the particular operation to be performed (e.g., MOVE, ADD, etc.), and the operand denotes an address or data upon which the operation is to be performed. Execution of an instruction is actually a process requiring several steps. For example, execution of an instruction may consist of four separate steps, in which the instruction must be decoded, the addresses of the operands computed, the operands fetched, and the operation executed. If each step occurs in one cycle of the microprocessor clock, four clock cycles are needed to execute an instruction. In a non-pipelined microprocessor, only one instruction is processed at a time. Therefore, the instruction rate is based on the time required to perform all of these separate steps. Thus, the instruction execution rate for a non-pipelined microprocessor is one instruction every four clock cycles. In a pipelined microprocessor, however, the four steps are performed concurrently on multiple instructions as they advance through the pipeline. After performing the first step on a given instruction, it is passed down the pipeline for the second step. At the same time, another instruction is brought into the pipeline for the first step. Continuing in this manner, instructions advance through the pipeline in assembly line fashion, and emerge from the pipeline at a rate of one instruction every clock cycle. Therefore, the pipeline-equipped microprocessor has an average instruction rate four times higher than the non-pipelined microprocessor.

The advantage of the pipeline consists in performing each of the steps required to execute an instruction concurrently. However, to operate efficiently, a pipeline must remain full. If the flow of instructions into and out of the pipeline is disrupted, clock cycles are wasted while the instructions within the pipeline are prevented from proceeding to the next processing step. Prior to execution, the instructions are typically stored in a memory device and must be fetched into the pipeline by the microprocessor. However, since access times for such memory devices is generally much longer than the operating speed of the microprocessor, instruction flow through the pipeline may be impeded by the length of time required to fetch instructions from memory.

An obvious approach to this problem would seem to be to simply use faster memory devices. Unfortunately, although faster memory devices are available, they are typically costlier and consume more power than conventional memory. In view of these disadvantages, the use of high-speed devices throughout the entire memory is usually infeasible. A more practical alternative for high performance microprocessors is the use of cache memory.

Cache is secondary memory resource, used in addition to the main memory. Cache generally consists of a limited amount of very high-speed memory. Since the cache is small (relative to the main memory), its cost and power consumption are not significant. Cache memory can improve microprocessor performance whenever the majority of instructions required by the microprocessor are concentrated in a particular region of memory. The principle underlying the use of cache is that, more often than not, the microprocessor will fetch instructions from the same area of memory. This is due to the fact that most instructions are executed by the microprocessor in the sequence in which they are encountered in memory.

The instructions comprising a typical microprocessor program are stored at consecutive addresses in memory. A program counter (or, PC) within the microprocessor keeps track of the address of the next instruction to be executed. For the majority of instructions, the PC is automatically incremented to point to the next instruction after a given instruction is executed. A special class of instructions, known as branch instructions, can modify the PC, causing the microprocessor to execute instructions at a non-sequential memory address. However, in most cases the branch will be to a nearby location. Naturally, some programs will contain frequent branches to non-local memory addresses, but the assumption of "locality" is usually justified.

Assuming the majority of instructions required by the microprocessor may be found in a given area of memory, the entire area is copied (e.g., in a block transfer) to the cache. The microprocessor then fetches the instructions as needed from the cache, rather than from the main memory. Since the cache is faster than the main memory, the pipeline is able to operate at full speed. Thus, cache memory can provide a dramatic improvement in average pipeline throughput, by providing the pipeline faster access to instructions than would be possible by directly accessing the instructions from conventional memory. As long as the instructions are reasonably localized, the use of a cache can significantly improve microprocessor performance.

A "cache miss" occurs when an instruction required by the microprocessor is not present in the cache. In response to a cache miss, the microprocessor typically discards the contents of its cache, and then fetches the necessary instructions as quickly as possible from memory and places them into the cache. Obviously, this is a source of overhead, and if it becomes necessary to empty and refill the cache very frequently, performance may begin to approach that of a microprocessor with no cache.

Note that the performance improvement due to cache depends on the expeditious transfer of the instructions from the targeted memory region into the cache. If the instructions were transferred at the same rate as a conventional memory access (i.e., at the rate at which the microprocessor would fetch them one at a time), there would be no improvement in speed—in fact, it is more likely that overall performance would be worse. Fortunately, it is possible to transfer the contents of a fixed-sized segment of memory (a "cache line") to cache en masse. For example, an 8-word cache line may be transferred to cache in the same amount of time as it takes for the microprocessor to fetch a single instruction from the memory. There are certain restrictions on this type of transfer, however. In particular, the boundaries of each cache line (i.e., the starting and ending memory address) are pre-determined, and may not be altered for a given transfer. To continue with the previous example, assume the cache line size is 8 words. This implies that cache lines occur on 8-word boundaries—i.e., that the starting address in memory of each cache line is a multiple of 8. Thus, cache lines would occur at (hexadecimal, or base-16) memory addresses of 0000h, 0008h, 0010h . . . etc. In order to place an instruction at a particular memory location into cache, the entire cache line containing the instruction (referred to herein as the "context" of the instruction) must be transferred. For instance, to place the instruction at memory location 4003h into cache, the entire cache line from address 4000h to address 4007h must be transferred. When a block of instructions is transferred from memory to the cache, it may need to be pre-decoded before the instructions can be used by the microprocessor. Pre-decoding refers to detecting the instruction boundaries within the instruction block. If every instruction occupied a single memory address, pre-decoding would be trivial, but variable length instructions make demarcation more complicated.

Microprocessors frequently employ variable length instructions to make efficient use of instruction memory. Thus, for example, a microprocessor may employ both single-word instructions (i.e., 16 bits long) and double-word instructions (i.e., 32 bits long). A comparison between single-word and double-word instructions is presented in FIG. 1. A typical single-word instruction 26 occupies one memory location (at some address n). A portion of the single-word instruction consists of an op code 30, which is a specific bit pattern identifying the instruction as for, example, an add or shift operation. The remainder of the instruction is an operand, which designates the register, memory location, etc. to which the instruction applies. A typical double-word instruction 28 occupies two consecutive memory locations (addresses n and n+1). The op code for a double-word instruction 32 is generally in the first word (i.e., the word at the lower memory address), and the operand may include the remainder of the first word along with the second word. It is important to realize that, in the absence of any other information, there are generally no criteria by which to recognize an instruction.

TABLE 1

Given a 16-bit word, the following possibilities exist:
1. The word is a single-word instruction
2. The word is the second word of a double-word instruction.

Given a pair of 16-bit words, the following possibilities exist:
1. The two words are the first and second words of a double-word instruction.
2. The first and second words are two consecutive single-word instructions.
3. The first word is either a single-word instruction or the second word of a double-word instruction, and the second word is either a single-word instruction or the first word of a double-word instruction.

The inherent ambiguity of instructions complicates pre-decoding of an instruction block, as described in detail below.

When an instruction block is fetched from memory, it may contain a combination of single-word and double-word instructions. In this case, the boundaries between the instructions are unknown, so the instruction block must be pre-decoded before the instructions can be entered into the pipeline. The process by which a block of instructions is fetched from memory and prepared for execution by a pipelined microprocessor is illustrated in FIG. 2.

In FIG. 2 an instruction block 12 is fetched from the internal memory 10 of a pipelined microprocessor 18. The size of the instruction block is based on the length of a cache line (typically, from 8 to 32 16-bit words). Given the fixed size of the cache line, the number of instructions in the block depends on the particular combination of single-word and double-word instructions. For example, if the cache line is 8 words long, the instruction block could contain as many as 8 single-word instructions or as few as 4 double-word instructions. To determine the boundaries of the single-word and double-word instructions in the fetched block, the instruction block is pre-decoded 14. The decoded instructions are then placed in the instruction cache 16 for execution by the microprocessor 18.

A problem arises with the conventional method of instruction pre-decoding, in regard to efficient cache utilization. As stated earlier, the instruction block fetched from memory must lie on a cache line boundary. In other words, the starting address and length of the instruction block are based on the cache line size. For example, with a cache line size of 8 words, when the microprocessor requests an instruction at memory location 4003h, an entire 8-word instruction block beginning at address 4000h is fetched. It should be clear that, depending on its address relative to the cache line boundaries, a requested instruction may appear anywhere within the fetched instruction block (i.e., the context of the instruction). A disadvantage of conventional pre-decoding is explained with reference to FIG. 3.

FIG. 3 represents an 8-word instruction block (illustrated beginning at instructions 22c, 22b, and 22a then the forward decoding instructions 20a, 20b, 20c, 20d, and 20e) along a cache line beginning at internal memory address 4000h, and extending to address 4007h. In this case, the microprocessor has requested the instruction at address 4003h, resulting in the entire instruction block being fetched from memory. As stated earlier, before the instructions in this block can be transferred to the cache, the block must be pre-decoded. The block contains a combination of single-word and double-word instructions, and the boundaries of these instructions must be known before the instructions can enter the pipeline.

The locations within the instruction block are relative to the address (4003h) of the requested instruction I1 20a, which is the value contained in the program counter (PC) of the microprocessor. Conventional pre-decoding proceeds in the forward direction (i.e., toward higher memory addresses) from requested instruction I1 20a, and establishes the addresses of the instructions subsequent to I1. This is easy to do, since there is no ambiguity concerning the size of instructions in the forward direction. For example, beginning with instruction I1 20a, the address of the next instruction I2 20b can be easily found. The microprocessor can determine from the op code of I1 whether it is a single-word or a double-word instruction. This tells the microprocessor whether instruction I2 20b is located one, or two memory locations away (i.e., PC+1, or PC+2, respectively). In the example of FIG. 3, I1 is a single-word instruction. Therefore, instruction I2 20b begins at address 4004h. Similarly, the op code of I2 indicates that it is also a single-word instruction, so instruction I3 20c must begin at address 4005h. The op code of instruction I3 reveals it to be a double-word instruction. Therefore, the microprocessor looks for instruction I4 20e two locations away, at address 4007h. Note that this technique works only because we are assured of beginning with the first word of an instruction (namely, the requested instruction, I1). Lacking this information, it would not be possible to resolve the ambiguities of Table 1.

While pre-decoding in the forward direction is straightforward, backward pre-decoding is generally not possible at all. Starting with a known instruction at the relative location of the PC is of no help in determining the boundaries of instructions at lower addresses (i.e., PC−1, PC−2 . . . etc.). For example, it is impossible to determine whether address 4002h in the instruction block contains a single-word instruction or the second word of a double-word instruction. Since the instructions preceding I1 cannot be decoded, they are not marked valid in the cache and cannot be entered in the pipeline. Thus, the inability to perform backward pre-decoding on the instruction block results in inefficient use of the cache. Although in the example of FIG. 3, only three memory locations (4000h–4002h) were unused, cache underutilization could be much worse, depending on where the requested instruction appeared within the cache line. For instance, if the requested instruction had been at memory address 4007h, the entire rest of the cache line could not be pre-decoded.

Under certain circumstances, the inefficient use of the cache described above can result in repeated fetches of the same instruction block from memory. FIG. 4 illustrates a common type of instruction sequence known as a loop. Each of the boxes represents an instruction. To the right of each instruction is its address in memory, and to the left its offset relative to the program counter (PC). Note that all of the instructions are contained within the same instruction block, spanning the address range from 4000h–4007h, and that the PC offset of the requested instruction I1 20a is zero. In a typical loop, instructions I1 20a through I4 20e would be executed in sequence. After executing instruction I4, the microprocessor's program counter would be directed to instruction I-2 24, which might test a condition to determine whether to terminate or continue execution of the loop. If this loop were first entered at instruction I1 20a (e.g., by branching from elsewhere in the program), the instruction block containing instruction I1 would be fetched from memory and be pre-decoded before placing it into the cache. According to the forward pre-decoding process described above, the boundaries of instructions I2–I4 would be readily determined. Instructions I1–I4 would then be placed into the cache for immediate access by the pipeline of the microprocessor. Instruction I-2, however, while present in the same instruction block as I1–I4, could not be pre-decoded. Therefore, following execution of I4, the microprocessor would be forced to request I4 from memory, whereupon the instruction block would be fetched a second time and the cache refilled.

Due to the frequent occurrence of loops and other similar structures in software programs, the scenario just described is believed to constitute a major source of inefficiency in the architecture of traditional microprocessors. In microprocessors employing variable length instructions, the inability to perform backward pre-decoding of an instruction block leads to underutilization of the cache. The impact on efficiency of cache underutilization will be software dependent, but it is estimated that cache misses could typically be reduced by 50% if it were possible to pre-decode the entire instruction block.

In view of this problem, it would be desirable to have a means to perform backward pre-decoding of an instruction block, so that as many of the instructions as possible could be delivered to the pipeline of the microprocessor. The method by which this is accomplished should preferably be suitable for implementation in the circuitry of a microprocessor. Furthermore, the method should be capable of high-speed operation, so as not to compromise the performance of the microprocessor.

SUMMARY OF THE INVENTION

The problems outlined above are addressed by a system and method for pre-decoding (i.e., determining the address boundaries of) combinations of single-word and double-word instructions within an instruction block fetched from memory. When the microprocessor requests an instruction at a specific memory address, a block of instructions including the requested instruction is fetched. The instructions in the block are taken from consecutive memory addresses. Prior to being placed in an instruction cache and executed by the microprocessor, the instructions must be pre-decoded. Conventional instruction methods allow only instructions originating at addresses at or beyond the address of the requested instruction to be pre-decoded. As a result, the remaining instructions in the block are not placed in the instruction cache. In contrast, the system and method disclosed herein permit instructions originating at addresses prior to that of the requested instruction to also be pre-decoded. This capability (referred to herein as "backward pre-decoding") results in more of the fetched instructions to be placed into the instruction cache, resulting in more efficient use of the cache.

A system is presented for backward pre-decoding a sequence of single-word and double-word instructions. The system consists of an instruction decoder that implements a binary decision tree, representing every possible combination of single-word and double-word instructions possible, given the length of the sequence. The op codes of the instructions used by the microprocessor are designed such that a marker bit pattern appears in all double-word instructions and in none of the single-word instructions. The address boundary of a double-word instruction cannot be deduced simply by detecting the marker bit pattern at a particular location within the sequence of instructions, since the same bit pattern can appear elsewhere than the op code of an instruction (e.g., in the form of an operand address). However, particular combinations of occurrences of the marker bit pattern within the sequence of instructions correspond unambiguously to unique combinations of single-word and double-word instructions. The nodes of the binary decision tree corresponding to the combinations of the marker bit pattern are used to recognize these unique combinations in a given sequence and derive the address boundaries of the instructions. The binary decision tree is readily implemented using standard logic, such as customarily present in the computational elements in a microprocessor.

A method for parsing an N-word sequence into a unique combination of single-word and double-word instructions is also presented. According to this method, a marker bit pattern is present in the op code of every double-word instruction, and absent in single-word instructions. Moreover, a binary decision tree is created representing every possible combination of single-word and double-word instructions in an N-word sequence. Markers are detected in the N-word sequence, and a binary decision tree used to determine the unique combination of single-word and double-word instructions corresponding to the detected marker occurrences. The method further calls for fetching the N-word sequence from a block of consecutive address locations in memory, and placing pre-decoded instructions into a cache for access by the instruction pipeline in the microprocessor.

BRIEF DESCRIPTION OF THE DRAWINGS

Other objects and advantages of the invention will become apparent upon reading the following detailed description and upon reference to the accompanying drawings in which.

Figure 1:
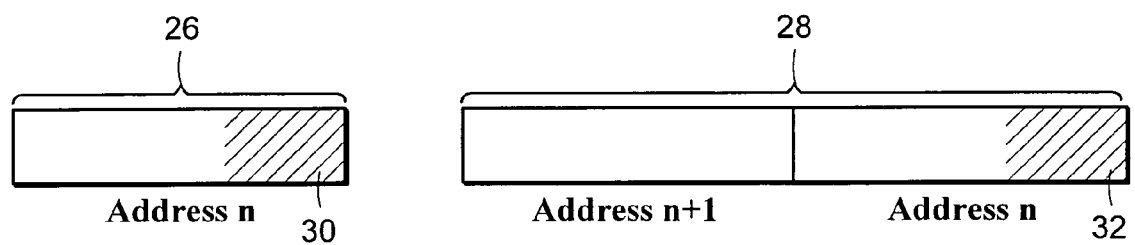
FIG. 1 illustrates the use of single-word and double-word instructions in a microprocessor.
Figure 2:
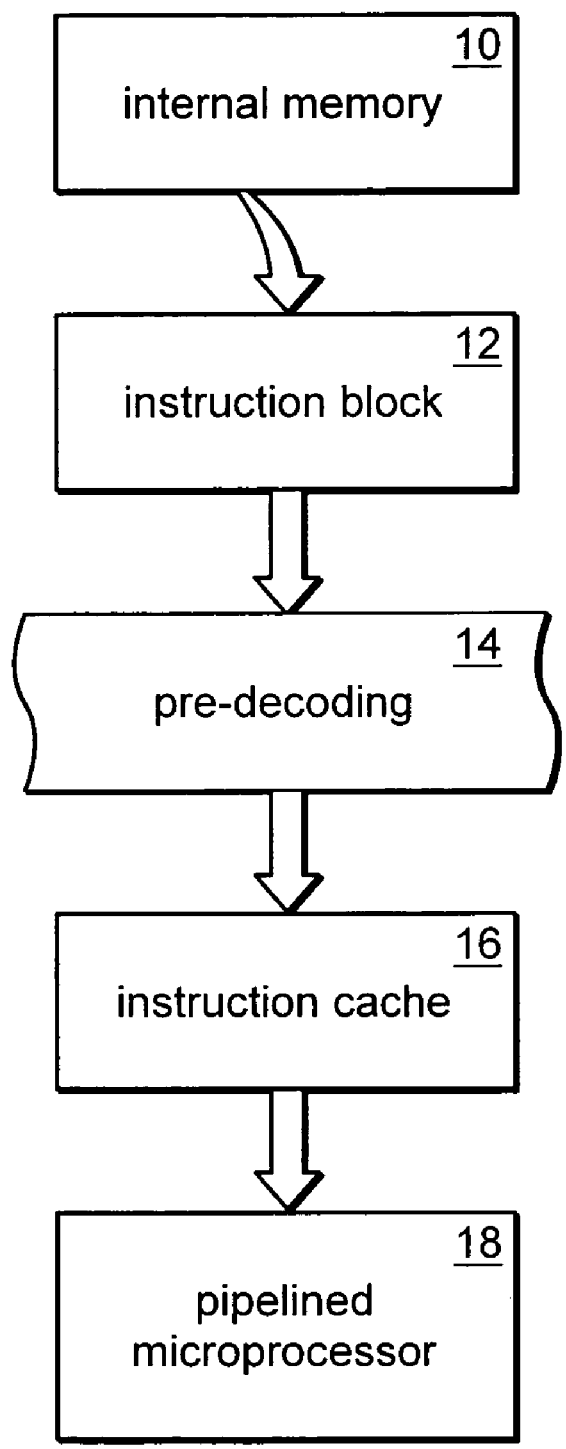
FIG. 2 illustrates the process by which instructions in an instruction block are transferred from internal memory to cache.
Figure 3:
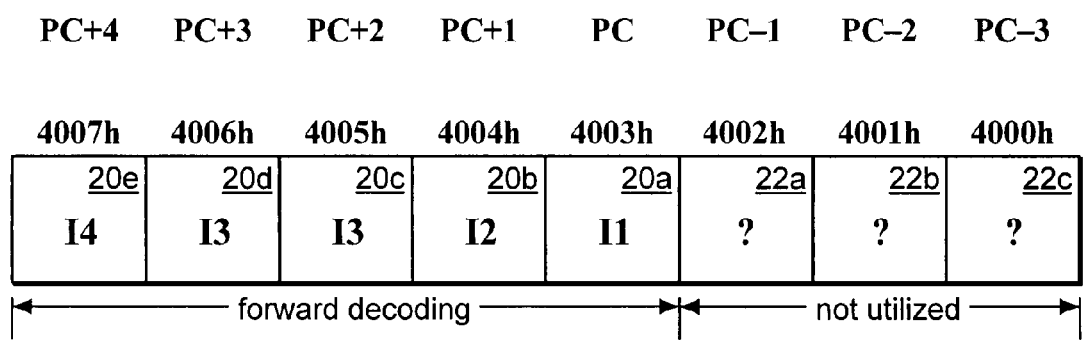
FIG. 3 represents the potential underutilization of the cache due to the inability to pre-decode instructions at lower memory addresses than the program counter.
Figure 4:
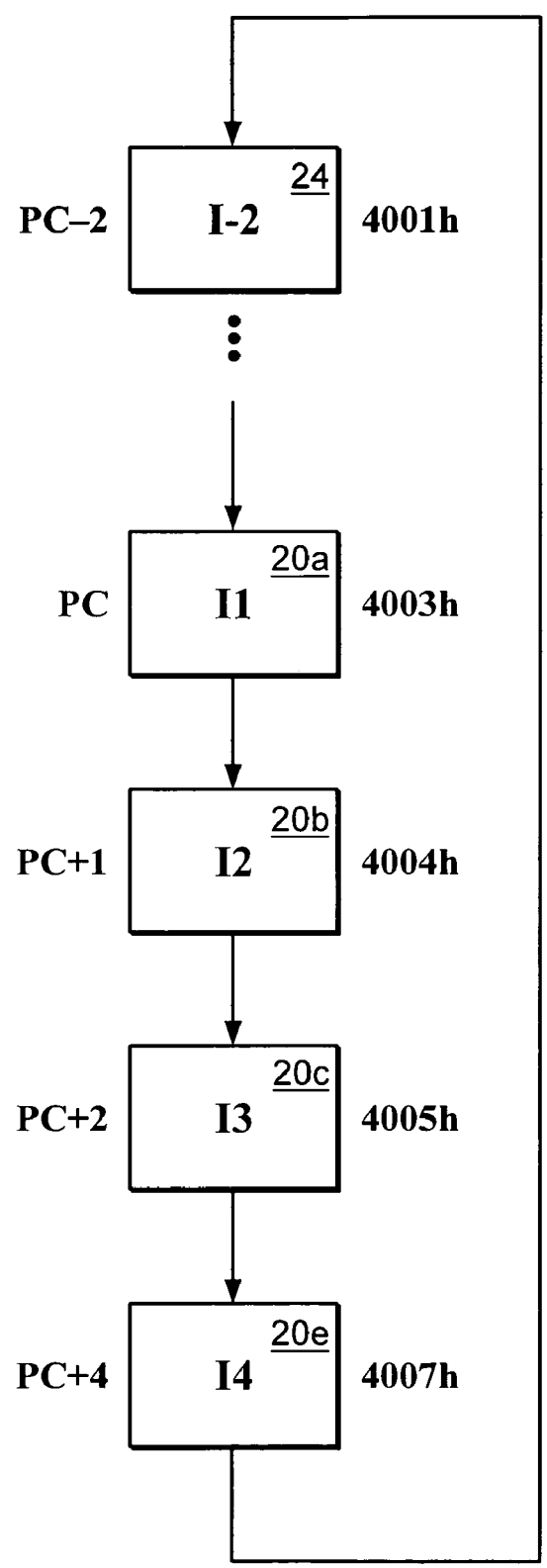
FIG. 4 represents the how instructions that have not been pre-decoded may need to be re-fetched from memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As described earlier, an instruction block is a region of the microprocessor's memory containing instructions. The instruction block is transferred into cache prior to execution of the instructions by the microprocessor. As used herein, the term "pre-decoding" refers to ascertaining the boundaries of instructions within an instruction block, and "backward pre-decoding" applies to pre-decoding instructions occurring prior to the requested instruction in the instruction block. A system and method are presented to perform backward pre-decoding of an instruction block, thereby improving cache utilization in a microprocessor employing variable length instructions.

Figure 5:
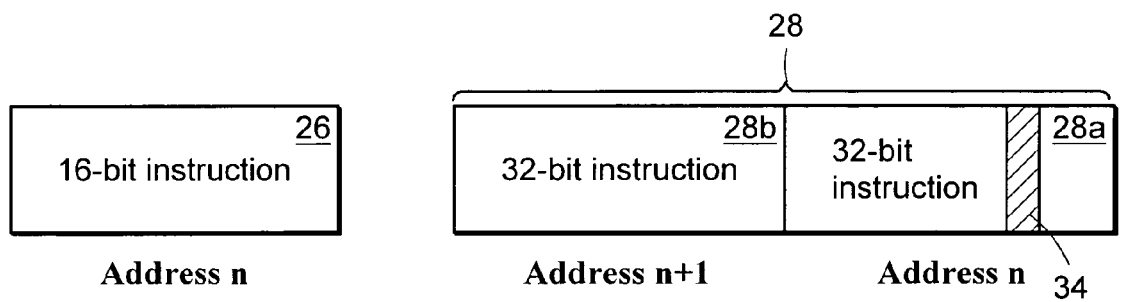
FIG. 5 illustrates single-word and double-word instructions, and the use of a marker bit pattern to distinguish the first word of a double-word instruction.

In an embodiment of the system and method disclosed herein, a microprocessor employs both 16-bit single-word instructions and 32-bit double-word instructions. FIG. 5 contains a comparison between the single-word and double-word instructions used by the microprocessor. The single-word instruction 26 occupies one location in memory, represented by address n. In contrast, the double-word instruction 28 occupies two consecutive locations—the first half of the instruction 28a occurring at address n and the second half of the instruction 28b occurring at address n+1. As explained earlier, backward decoding of an instruction sequence is problematic due to the fact that the instruction boundaries are not detectable in the backward direction. Thus, if one were to take a single word from an instruction sequence, there would be no way to tell whether the word represented a single-word instruction, or the first or second word of a double-word instruction.

As shown in FIG. 5, the present system and method makes use of a specific "marker" bit pattern 34 in the first word of every double-word instruction. The marker pattern can be a sequence of bits present in the op code of all double-word instructions. The marker can be used to distinguish single-word and double-word instructions—i.e., if a given 16-bit word does not contain this marker, then it cannot be the first word of a double-word instruction. This information can be applied in demarcating instruction boundaries, since an instruction boundary (i.e., a single-word instruction or the first word of a double-word instruction) must occur wherever the preceding word lacks the marker pattern. The use of this marker does not completely resolve the ambiguity of the instruction boundaries, however. A word that contains the marker could be either first or the second word of a double-word instruction. Consequently, when a sequence of words is encountered which all contain the marker it is impossible to ascertain the instruction boundaries. The only way the starting location of an instruction (i.e., the location of a single-word instruction, or the first word of a double-word instruction) can be definitely known is if the preceding word (the word at the next lower memory address) does not contain the marker. For example, if the word at address 4003h does not contain the marker, then it cannot be the first word of a double-word instruction. In that case, the word at location 4004h cannot be the second word of a double-word instruction, and must either be a single-word instruction or the first word of a double-word instruction.

Figure 6:
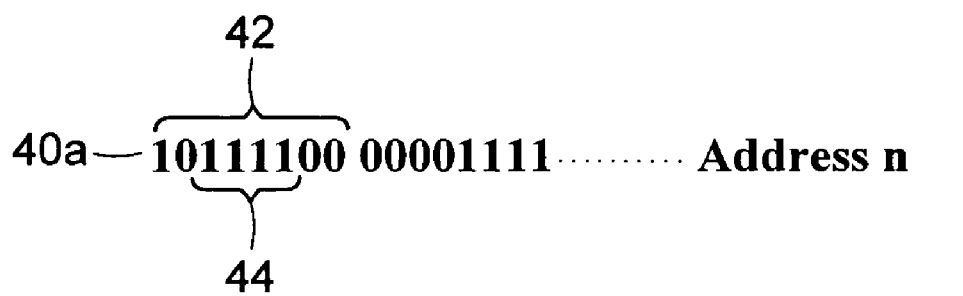
FIG. 6 illustrates the use of op codes and the presence of a marker pattern in the op code of a double-word instruction.
Figure 6:
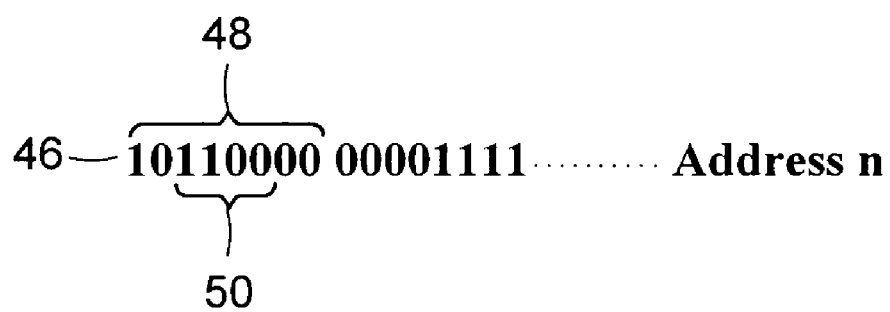
Figure 6:
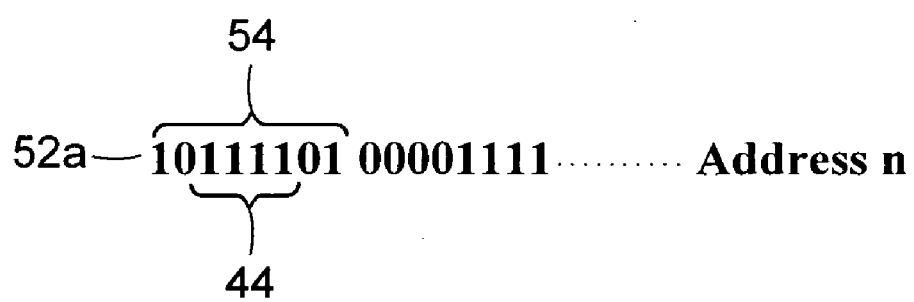

FIG. 6 compares the structure of single-word and double-word instructions, showing the relationship between the marker and the op code in a double-word instruction, and illustrating the possible ambiguity of the second word of a double-word instruction. A double word instruction is shown, consisting of a first 16-bit word 40*a* at address n and second 16-bit word 40*b* at address n+1. For illustrative purposes, the op code of the double-word instruction is assumed to comprise the first 8 bits 42 of the first word 40*a*. The remainder of the instruction is the operand, which may consist of a memory address. Within the op code 42 of the first word 40*a* of the double-word instruction is a 4-bit marker sequence 44. This marker sequence, (i.e., 1111) in this particular position within the op code, serves to distinguish the first word of a double-word instruction from all single-word instructions. For example, any single-word instruction 46 with an 8-bit op code 48 has a different bit pattern 50 (i.e., 1100) in the same corresponding position. As noted above, this characteristic makes it possible to distinguish the first word of a double-word instruction from a single-word instruction. A second double-word instruction 52*a* and 52*b* is shown in FIG. 6. Note that the op code 54 for this instruction differs from that of the pervious double-word instruction 40*a* and 40*b* (i.e., 10111101 vs. 10111100). The op code of the first instruction might, for example, denote a "Move from Register to Memory Location" instruction, while the second op code represents a "Jump to Program Location" instruction. Thus, each different double-word instruction has a distinct op code; however, the op code for every double-word instruction must contain the marker bit pattern 44. Note that the second word 52*b* of the second double-word instruction also (coincidentally) contains the bit marker pattern 44. In this case, the bit pattern 1111 is not part of the op code of the instruction, but simply occurs by chance in the operand (for example, as part of a memory address 0011110000001100). Without prior knowledge that the 16-bit value 52*b* containing this pattern is the second word (and not the first) of a double-word instruction, the appearance of the marker pattern is ambiguous, and cannot be used to detect the instruction boundary.

Along with the marker pattern, the present system and method employ a binary decision tree to perform backward pre-decoding of an instruction block. The binary decision tree uses occurrences of the marker pattern within the context of the other instructions in an instruction block to detect instruction boundaries. There are some cases in which backward decoding is not possible by this method. However, in the majority of cases, more instructions within the instruction block can be pre-decoded than are dealt with by present approaches, which rely only on forward pre-decoding. Since more of the instruction block is pre-decoded, more of the instructions in the block can be made available to the pipeline. As a result, cache misses are less frequent, and cache efficiency is improved.

Figure 7:
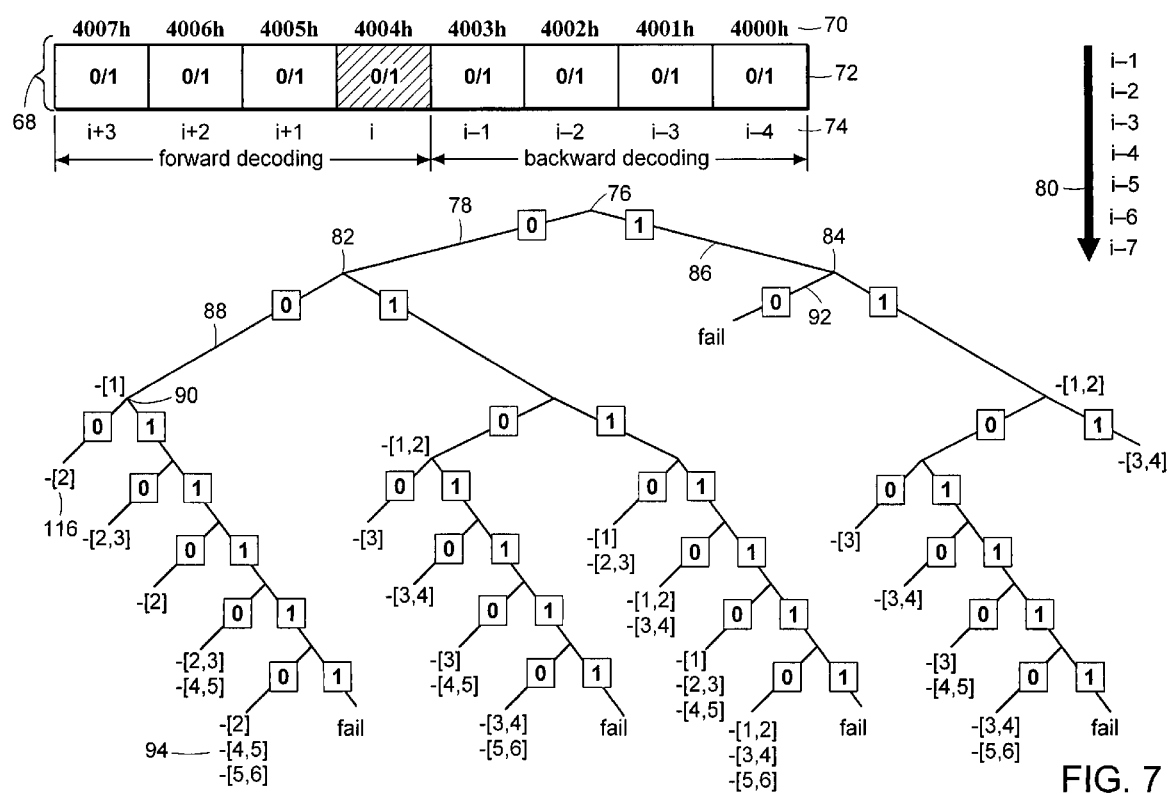
FIG. 7 illustrates the use of a binary decision tree to perform backward pre-decoding from an arbitrary context within an instruction block.

FIG. 7 represents a binary decision tree for an embodiment of the present system and method, in which the size of a cache line is eight 16-bit words. The instruction block 68 in this example contains eight words fetched from the instruction memory at addresses 70 ranging from 4000h–4007h. Recall that an instruction block is fetched in response to a request for an instruction. In this case, the requested instruction (hatched pattern) came from memory location 4004h. The relative location of all eight words in the instruction block with respect to the requested word 74 are expressed in terms of i. For example, the relative location within the instruction block of the requested instruction itself is i, while that of the next word is i+1, and that of the preceding word is i−1 etc. Forward decoding of the words in the instruction block begins with the requested instruction and continues in the direction of higher addresses. Similarly, backward decoding proceeds in the direction of lower addresses. A binary value of 0 or (designated as numeral 72) is associated with each of the words in the instruction block, depending on whether the respective word contains the double-word marker discussed above.

A binary decision tree is composed of nodes and branches. Nodes occur at the end of a branch, and two branches issue downward from each node—one to the left and one to the right. Each node represents a test, and the branches represent the two possible outcomes of the test. A binary tree is shown in FIG. 7, depicting the backward pre-decoding of the instruction block 68. Note that the nodes in the tree occupy different levels. For example, node 76 is alone at the top level of the tree, while nodes 82 and 84 are at the second level, etc. The levels in the tree correspond to the relative displacement of a corresponding word in the instruction block. The dark arrow 80 indicates the correspondence between the node levels and the relative addresses of words in the instruction block. The pair of branches from each node represents the two possible outcomes of a test to see whether the corresponding word contains the marker or not. A 1 signifies that the marker was detected, while a 0 signifies that the marker was not detected. Thus, the top-most node 76 in the binary decision tree shown in FIG. 7 is associated with the word at location i−1 (i.e., the word preceding the requested instruction) in the instruction block 68, and the branches 78 and 86 represent the result of testing that word for the presence of the marker. Similarly, second level node 82 represents testing the word at location i−2 when the word at location i−1 did not contain the marker, while second level node 84 represents testing the same word when the word at location i−1 did contain the marker. Note that there are a total of seven levels in the binary decision tree. This corresponds to the case when the requested instruction happens to lie at the uppermost address in the instruction block (address 4007h in the present example). In that case, forward pre-decoding is possible for only one instruction, but backward pre-decoding can be attempted on all seven preceding words in the instruction block.

The binary decision tree in FIG. 7 represents all possible outcomes for backward pre-decoding of an 8-word instruction block. Using the binary decision tree, pre-decoding of an instruction block is a mechanical process, accomplished by traversing the tree from the top node and following left or right branches to the lower nodes. The bracketed numbers appearing beside certain nodes represent a pre-decoding result for the instruction block at one or more relative locations corresponding to the bracketed numbers. For example, −[2] indicates a single-word instruction at relative location i−2, and −[3,4] indicates a double-word instruction at relative locations i−3 and i−4.

As an example of the use of the binary decision tree, assume the test represented by node 76 indicates that the word at relative location i−1 in the instruction block does not contain the marker. Branch 78 will then be taken to node 82. Since it is known that the word at relative location i is on an instruction boundary, it can be concluded that the word at relative location i−1 is either a single-word instruction or the second word of a double-word instruction. Proceeding to the second level of the tree, the word at relative location i−2 (i.e., the word preceding the requested word) will be tested at node 82. If the word at location i−2 also does not contain the marker, then branch 88 is taken to node 90. Moreover, the decision tree also yields a result at this point. It was known from the previous test that the word at location i−1 is either a single-word instruction or the second word of a double-word instruction. The test at node 82 showed that the word at location i−2 also does not contain the marker. Hence, the word at location i−2 cannot be the first word of a double-word instruction. This implies that the word at location i−1 must be a single-word instruction. This result is represented by the bracketed quantity −[1], which indicates a single-word instruction (signified by a single number, as opposed to a pair of numbers for a double-word instruction) at a relative location of i−1. In some cases, the instruction boundaries cannot be ascertained and backward pre-decoding is unsuccessful. The binary decision tree indicates such an outcome by a "fail" result at a terminating node. For example, if the test at node 76 indicates that the word at relative location i−1 does contain a marker, branch 86 will be taken to node 84. At this point, the word at location i−2 is tested for the presence of the marker. If the word at relative location i−2 does not contain the marker, branch 92 will be taken to a "fail" terminating node. The explanation for this result is as follows. The word at location i is known to be an instruction. Therefore, if the word at location i−1 contains the marker, then it must be the second word of a double-word instruction. Consequently, if the word at location i−2 does not contain the marker (meaning that it is not the first word of a double-word instruction), there is a problem with the instruction block, and any further efforts to pre-decode the instruction block would be meaningless.

In some cases, multiple instruction boundaries are decoded. For example, at node 94, the bracketed results indicate that a single-word instruction occurs at relative location i−2, a double-word instruction occurs at locations i−4 and i−5, and another double-word instruction occurs at locations i−5 and i−6.

Figure 8:
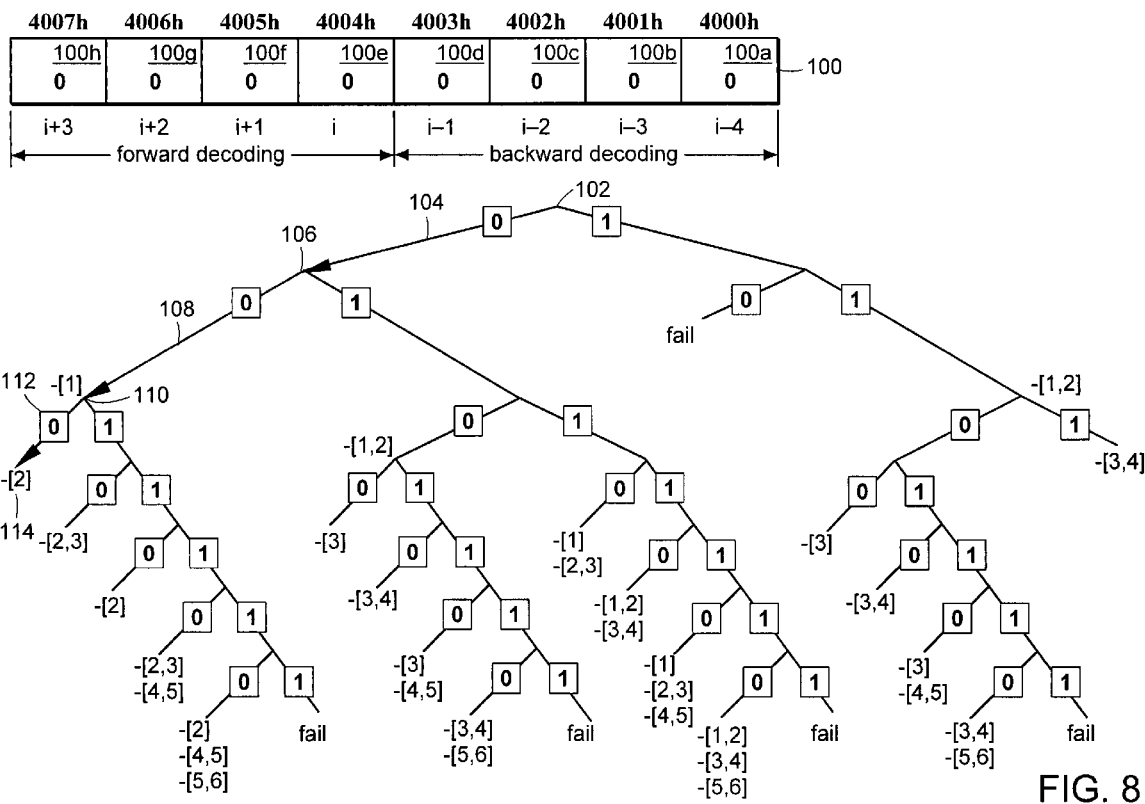
FIG. 8 illustrates the use of the binary decision tree to perform backward pre-decoding on an instruction block containing only single-word instructions.

FIG. 8 illustrates the use of the binary decision tree to perform backward pre-decoding of an instruction block containing only single-word instructions. In this example, the instruction block 100 consists of an 8-word instruction block fetched from memory locations 4000h–4007h, with the requested instruction appearing at location 4004h. Each word 100*a*–*h* is shown with a value of 0, since none of them contain the double-word marker. The bold arrows in the corresponding binary decision tree trace the path taken in evaluating the instruction block. Beginning at node 102, the word 100*d* (at relative location i−1) is tested for the presence of the marker. Since it does not contain the marker, branch 104 is taken to node 106. Note that no conclusion about the word 100*d* can be reached at this point—it could be a single-word instruction, or the second word of a double-word instruction. At node 106, word 100*c* (at location i−2) is tested for the marker. Since word 100*c* also does not contain the marker, the branch 108 to node 110 is taken. Furthermore, since both words 100*d* and 100*c* do not contain the marker, it is now possible to infer that word 100*d* is a single-word instruction. This result is shown as −[1] at node 110. The test performed at node 110 shows that word 100*b* (at location i−3) does not contain the marker, so branch 112 is taken to a terminating node 114, with a result of −[2]. This result signifies that word 100*c* is a single-word instruction, and is based on the fact that both words 100*c* and 100*b* do not contain the marker. In the present embodiment backward pre-decoding of the instruction block ends at this point. However, it should be apparent that a test at node 114 indicating that word 100*a* (at location i−4) does not contain the marker implies that word 100*b* is a single-word instruction. It should also be clear that this process could be extended even further with larger instruction blocks and using more extensive decision trees.

Figure 9:
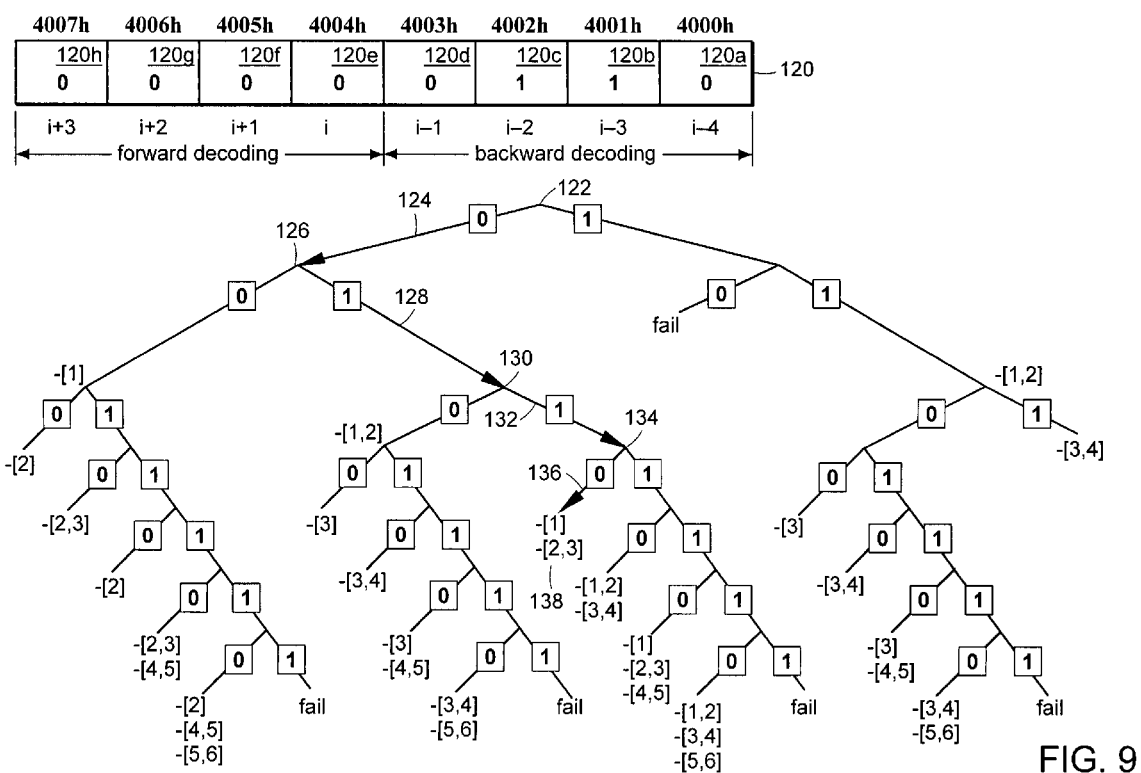
FIG. 9 illustrates the use of the binary decision tree for backward pre-decoding on an instruction block containing both single-word and double-word instructions.

FIG. 9 illustrates the use of the binary decision tree to perform backward pre-decoding of an 8-word instruction block 120 containing both single-word and double-word instructions. As in the previous example, the instruction block comprising the instruction block consists of words 120*a*–*h* fetched from memory locations 4000h–4007h, and the requested instruction 120*e* (corresponding to the program counter of the microprocessor) is at location 4004h. Therefore, there are four instructions (120*e*–*h*) that can be forward decoded, and four (120*a*–*d*) that must be backward decoded. Note that words 120*c* and 120*d* (at memory locations 4001h and 4002h in the instruction block 120) are shown with a value of 1, signifying that they both contain the double-word marker.

The path through the binary decision tree begins at node 122 by testing word 120*d* for the presence of the marker. Word 120*d* precedes the requested instruction in the instruction block (at relative location i−1), and was fetched from memory location 4003h. Since this word does not contain the marker, branch 124 is taken to node 126. No result is available at this point, since it is not known whether word 120*d* is a single-word instruction or the second word of a double-word instruction. At node 126 word 120*c* (at relative location i−2) is tested for the presence of the marker. As noted above, this word does contain the marker. Therefore, branch 128 is taken to node 130. The binary tree still yields no result, however, because it is not known whether words 120*c* and 120*d* form a double-word instruction, or word 120*d* is a single-word instruction and word 120*c* is the second word of a double-word instruction. At node 130 word 120*b* (at relative location i−3) is tested. As noted above, this word also contains the marker. Therefore, branch 132 is taken to node 134. Even at this point, the binary decision tree gives no result, since it is still not possible to determine whether word 120*d* is a single-word instruction and words 120*c* and 120*b* form a double-word instruction, or whether the words 120*d* and 120*c* form a double-word instruction and word 120*b* is the second word of another double-word instruction. At node 134 word 120*a* (at relative location i−4) is tested. This word does not contain the marker, so branch 136 is taken to terminating node 138, and the binary yields a result. Since word 120*a* does not contain the marker, it cannot be the first word of a double-word instruction. Consequently, word 120*b* cannot be the second word of a double-word instruction. And since word 120*b* does contain the marker, it must be the first word of a double-word instruction. Therefore, words 120*c* and 120*b* form a double-word instruction. This further implies that word 120*d* is a single-word instruction. These two results are represented by the two bracketed numbers −[2,3] and −[1] displayed next to node 138. In this example, the binary decision tree has decoded two instructions preceding the requested instruction in the instruction block. As explained earlier, this is advantageous. If these two instructions were subsequently required by the pipeline, they would be immediately available, without having to re-fetch the instruction block from memory.

In some cases, there may not be enough information available in the instruction block to perform backward decoding. When this happens, the binary decision tree fails to yield a result and only forward decoding is possible. Thus, in a worst-case scenario, the present system and method operate as a conventional instruction decoder. An example of this is presented in FIG. 10. As before, the instruction block 150 is fetched from memory locations 4000h–4007h.

In this case, word 150*d* at relative location i−1 (i.e., immediately preceding the requested instruction, 150*e*) is shown with the value 0, indicating that it does not contain the double-instruction marker. However, the words 150*a*–*c* at relative locations i−2 through i−4 are shown with a value of 1, indicating that they all contain the marker. As described in detail below, the occurrence of the marker bit pattern in these three consecutive words makes it impossible to determine the instruction boundaries by backward decoding.

Figure 10:
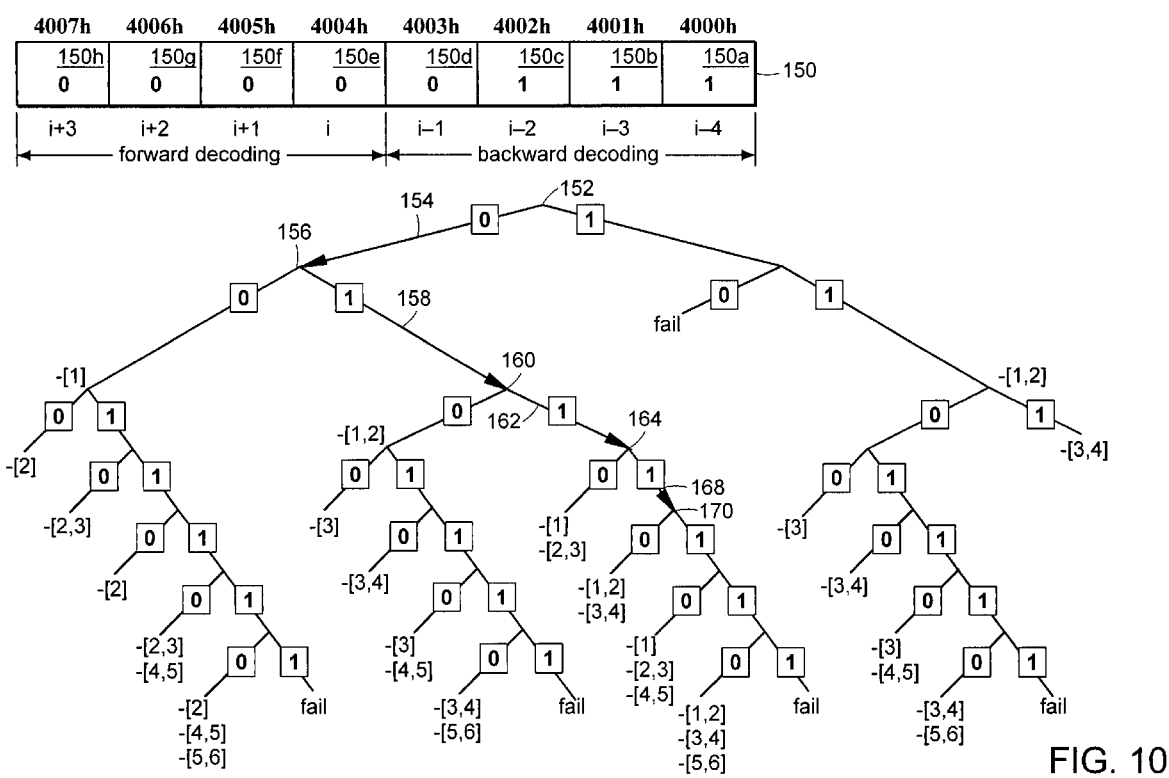
FIG. 10 illustrates the failure of the binary decision tree to perform backward pre-decoding of an instruction block containing an ambiguous combination of single-word and double-word instructions.

Beginning at the top node 152 of the binary decision tree in FIG. 10, word 150*d* (relative location i−1) in the instruction block is tested for the presence of the marker. Since word 150*d* does not contain the marker, branch 154 is taken to node 156. Since word 150*d* does not contain the double-word marker, it cannot be the first word of a double-word instruction—however, it could be either a single-word instruction or the second word of a double-word instruction. Consequently, no result is available at node 156. Word 150*c* (relative location i−2) is tested at node 156. Since word 150*c* does contain the marker, branch 158 is taken to node 160. Here, again, no result is possible. Since word 150*c* contains the marker and word 150*d* does not, it may be the case that word 150*c* and 150*d* form a double-word instruction. Alternatively, word 150*d* may be a single-word instruction and word 150*c* may be the second word of double-word instruction (which just happens to contain the marker pattern). At node 160, word 150*b* is tested and found to contain the marker pattern. Branch 162 is then taken to node 164. There is still no result at node 164, because the marker occurrences up to this point are ambiguous. Since word 150*b* contains the marker pattern, it may be the first word of a double-word instruction (of which word 150*c* is the second word), or it may be the second word of a double-word instruction (of which word 150*a* is the first word). The last word 150*a* in the instruction block is tested at node 164. Since word 150*a* contains the marker, branch 168 is taken to node 170. Once more, no result is available from the binary decision tree. Since word 150*a* contains the marker, it may be the first word of a double-word instruction (with word 150*b* as the second word). In this case, word 150*c* would be the first word of another double-word instruction (with word 150*d* as the second word). Alternatively, word 150*a* could be the second word of a double-word instruction. In this case, word 150*b* and word 150*c* would form a double-word instruction and word 150*d* would be a single-word instruction. Given the contents of the instruction block, it is impossible to know which of these two possibilities describes the actual instruction boundaries, so backward pre-decoding fails.

In a worst-case scenario, such as that represented in FIG. 10, the present system and method for backward decoding are equivalent to a conventional instruction decoder (i.e., forward decoding only). For example, in FIG. 10 the instruction boundaries for words 150*e*–*h* (relative locations i through i+3) would be readily ascertained by forward decoding. In all other cases, the system and method disclosed herein permit backward decoding of at least some of the instructions in the instruction block. As explained earlier, backward decoding of the instruction block contributes to more efficient utilization of the cache by making more of the instructions in the cache available to the pipeline. Therefore, cache misses occur less frequently, and overhead associated with re-fetching instruction blocks is minimized. Although the embodiments discussed herein refer to 16-bit and 32-bit instructions, it should be clear that the use of a double-word marker and binary decision tree are applicable to other instruction sizes as well.

Figure 11:
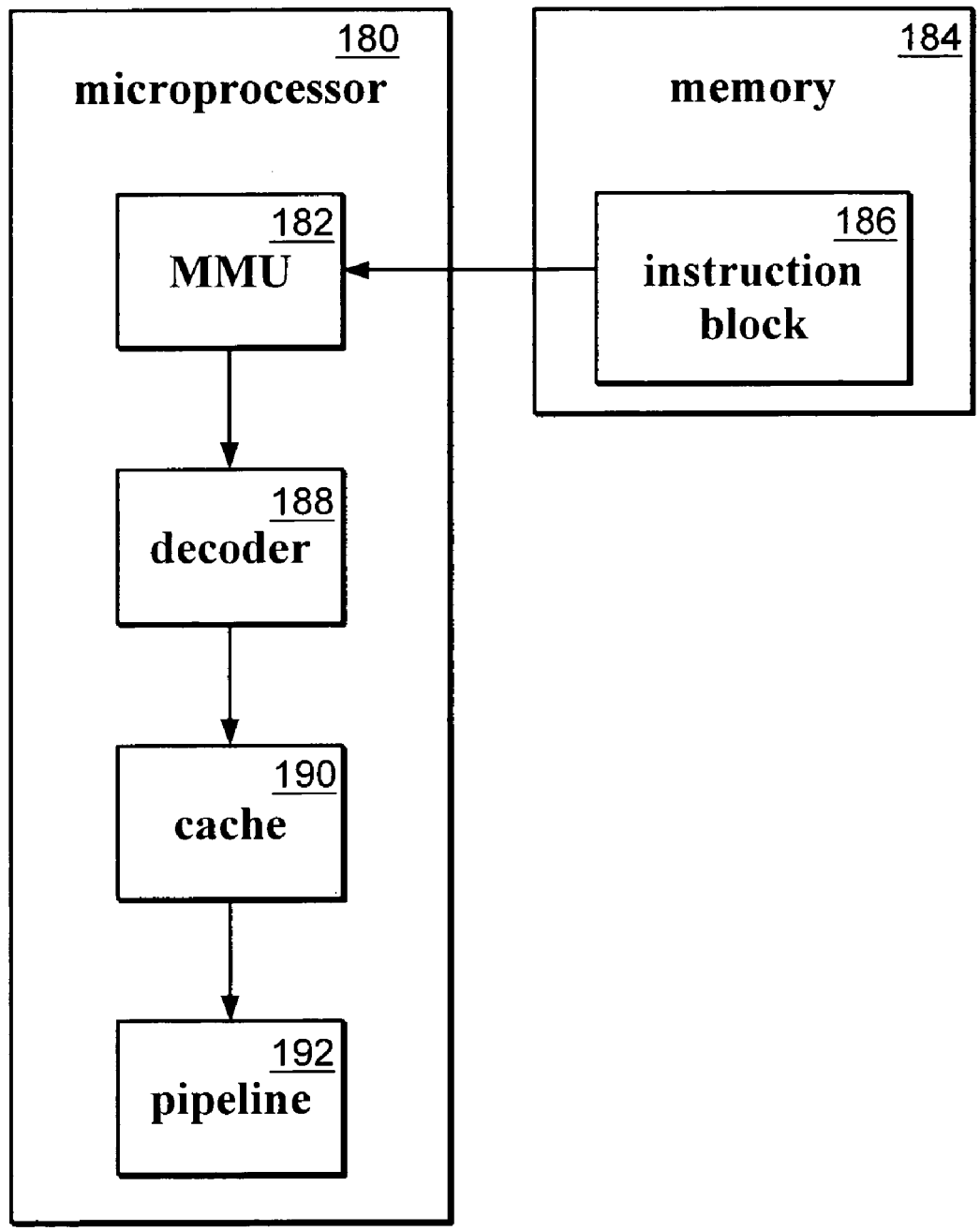
FIG. 11 contains a block diagram of a microprocessor and memory embodying the present system and method.

FIG. 11 contains a block diagram of a microprocessor and memory embodying the system and method disclosed herein. When the microprocessor 180 requires an instruction at an address in memory specified by the microprocessor's program counter, a memory management unit (MMU) 182 in the microprocessor fetches a block of instructions 186 containing the required instruction from memory 184. The number of instructions in the block 186 is determined by the capacity of the cache 190 (i.e., the number of words in a cache line). Memory 184 may be incorporated within the microprocessor 180, or (as suggested in FIG. 11) it may be external to the microprocessor. The MMU 182 places instructions from the instruction block 186 into the cache 190 of the microprocessor, from which they are fed into the pipeline 192 as they are executed. Prior to being placed in the cache, instructions in the instruction block must be pre-decoded. Pre-decoding includes determining the instruction boundaries, and is carried out by an instruction decoder 188. The instructions in the block 186 are fetched from consecutive addresses in memory 184, and the required instruction may occur anywhere within the block, depending on its address relative to the starting address of the block. As explained elsewhere in this document, a conventional decoder pre-decodes only the instructions in the block that originated at addresses higher than that of the requested instruction (hence, the term, "forward pre-decoding"). In contrast, a decoder 188 embodying the present system and method is also able to pre-decode instructions corresponding to addresses lower than that of the requested instruction ("backward pre-decoding"). To accomplish backward pre-decoding, markers present in the op code of each double-word instruction are detected by instruction decoder 188. The decoder then applies a binary decision tree to the resulting pattern of marker occurrences to determine (if possible) the single-word and double-word instruction boundaries, as described above. The marker detection and the binary decision tree functions in decoder 188 are both readily implemented using standard logic, as employed elsewhere in the microprocessor.

It will be appreciated by those skilled in the art having the benefit of this disclosure that this invention is believed to present a system and method for determining the boundaries of instructions in an instruction block fetched from memory, relative to an arbitrary initial offset within the instruction block. Further modifications and alternative embodiments of various aspects of the invention will be apparent to those skilled in the art in view of this description. Details described herein, such as the size of the cache line, are exemplary of a particular embodiment. It is intended that the following claims be interpreted to embrace all such modifications and changes and, accordingly, the specification and drawings are to be regarded in an illustrative rather than a restrictive sense.

What is claimed is:

1. A system containing an N-word sequence of single-word and double-word instructions and an instruction decoder, wherein the double-word instructions comprise a marker bit pattern, and wherein the instruction decoder comprises logic for implementing a binary decision tree having a set of nodes arranged from a top-most node to a bottom-most node representing successively preceding memory address locations relative to an address location requested by a microprocessor, and wherein the logic is configured by the binary decision tree to determine if an instruction corresponding to an address location immediately preceding the address location requested by the microprocessor is a single-word instruction or a double-word instruction depending on whether tests performed on at least two nodes lower than the top-most node determines that the instructions corresponding to at least two successively preceding memory address locations contain the marker bit pattern.

2. The system as recited in claim 1, wherein the instruction decoder is contained within the microprocessor and such that a unique combination of single-word and double-word instructions in the N-word sequence is executable by the microprocessor.

3. The system as recited in claim 1, further comprising a memory and a cache, wherein the N-word instruction sequence is transferred from the memory to the cache in response to the microprocessor requesting a specific single-word or double-word instruction present within the N-word sequence.

4. The system as recited in claim 1, wherein each word in the N-word sequence corresponds to one of a series of N consecutive memory addresses.

5. The system as recited in claim 1, wherein the instruction decoder is further adapted to identify the corresponding address of at least one single-word or double-word instruction within each unique combination of single-word and double-word instructions in the N-word sequence.

6. The system as recited in claim 1, wherein the instruction decoder is further adapted to identify the corresponding address of at least one single-word or double-word instruction within a unique combination of single-word and double-word instructions having addresses prior to that of the instruction requested by the microprocessor.

7. The system as recited in claim 2, wherein the microprocessor further comprises a pipeline, into which single-word and double-word instructions from the N-word sequence pass in order to be executed by the microprocessor.

8. The system as recited in claim 1, wherein the marker bit pattern is part of the op code of each double-word instruction.

9. The system as recited in claim 1, wherein the instruction decoder is implemented using standard logic cells, and shares a common semiconductor substrate with the microprocessor within an integrated circuit.

10. A method for parsing a sequence of N words into a unique combination of single-word and double-word instructions, comprising:
  detecting occurrences of a marker bit pattern present in the op code of each of the double-word instructions and absent from any of the single-word instructions;
  creating a binary decision tree to associate with every possible N-word combination of single-word and double-word instructions a corresponding marker bit pattern; and
  employing the binary decision tree to determine whether an instruction at a top node of the tree corresponding to a first preceding address location immediately preceding an address location requested by a microprocessor is a single-word or double-word instruction depending on whether at least two instructions below the top node of the tree corresponding to successive address locations immediately preceding the first preceding address location contains the marker bit pattern.

11. The method as recited in claim 10, further comprising employing an instruction decoder within the microprocessor to parse the sequence of N words into a unique combination of single-word and double-word instructions, wherein the microprocessor is adapted to execute said single-word and double-word instructions.

12. The method as recited in claim 11, further comprising transferring the sequence of N words from a memory to a cache in response to the microprocessor requesting a specific single-word or double-word instruction present within the sequence of N words.

13. The method as recited in claim 12, wherein each word in the sequence of N words corresponds to one of N consecutive memory addresses.

14. The method as recited in claim 13, further comprising identifying the corresponding address of at least one single-word or double-word instruction within each unique combination of single-word and double-word instructions present within the sequence of N words.

15. The method as recited in claim 14, further comprising identifying the corresponding address of at least one single-word or double-word instruction within a unique combination of single-word and double-word instructions present within the sequence of N words and having addresses prior to that of the instruction requested by the microprocessor.

16. The method as recited in claim 14, further comprising, after parsing the sequence of N words into a unique combination of single-word and double-word instructions, placing said single-word and double-word instructions into a pipeline in order to be executed by the microprocessor.

17. The method as recited in claim 10, further comprising including the marker bit pattern within the op code of all double-word instructions and omitting it from all single-word instructions.

18. The method as recited in claim 10, further comprising implementing the binary decision tree and marker bit pattern detection using standard logic within the microprocessor.

19. The method as recited in claim 10, further comprising determining whether an instruction at a first node immediately beneath the top node of the tree corresponding to a second preceding address location immediately preceding the first preceding address is a single-word or double-word instruction depending on whether at least two instructions below the first node of the tree corresponding to successive address locations immediately preceding the second preceding address location contains the marker bit pattern.

20. A memory medium, comprising:
  an N-word sequence of single-word and double-word instructions, wherein the op-code of the double-word instructions contain a marker bit pattern;
  a binary decision tree, representing every possible combination of occurrences of the marker bit pattern for the N-word sequence, and identifying each combination associated with a unique sequence of single-word and double-word instructions; and
  means for consulting the binary decision tree to determine whether an instruction at a top node of the tree corresponding to a first preceding address location immediately preceding an address location requested by a microprocessor is a single-word or double word instruction depending on whether at least two instructions below the top node of the tree corresponding to successive address locations immediately preceding the first preceding address location contains the marker bit pattern.

21. The memory medium as recited in claim 20, wherein the N-word sequence of single-word and double-word instructions is contained within a memory coupled to a microprocessor and the binary decision tree is implemented by logic elements within the microprocessor, and wherein the microprocessor and memory occupy a monolithic substrate.

22. The memory medium as recited in claim 20, further comprising consulting the binary decision tree to determine whether an instruction at a first node immediately beneath the top node of the tree corresponding to a second preceding address location immediately preceding the first preceding address is a single-word or double-word instruction depending on whether at least two instructions below the first node of the tree corresponding to successive address locations immediately preceding the second preceding address location contains the marker bit pattern.

* * * * *